Nov. 18, 1958     G. C. R. KUIPER ET AL     2,860,913
FOLDING TOP WITH INWARDLY COLLAPSING SIDE RAILS
Filed Nov. 1, 1954     3 Sheets-Sheet 1
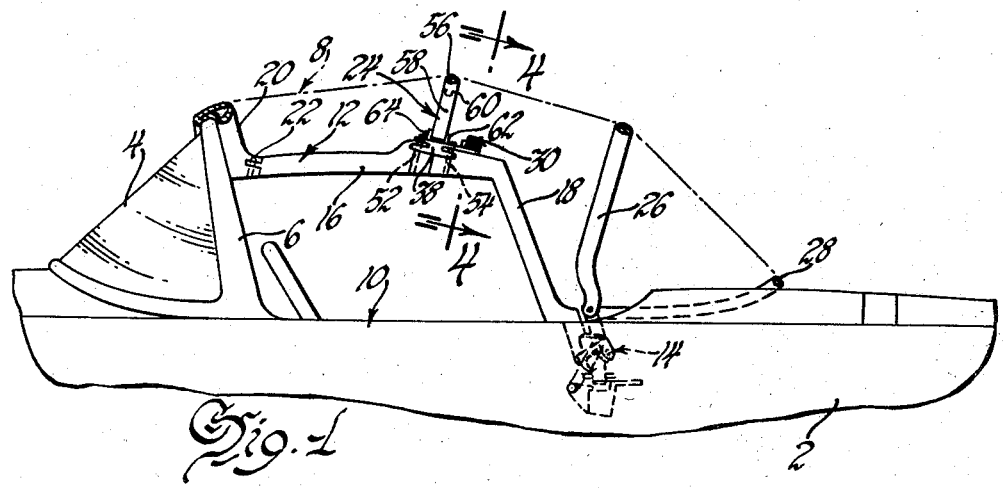
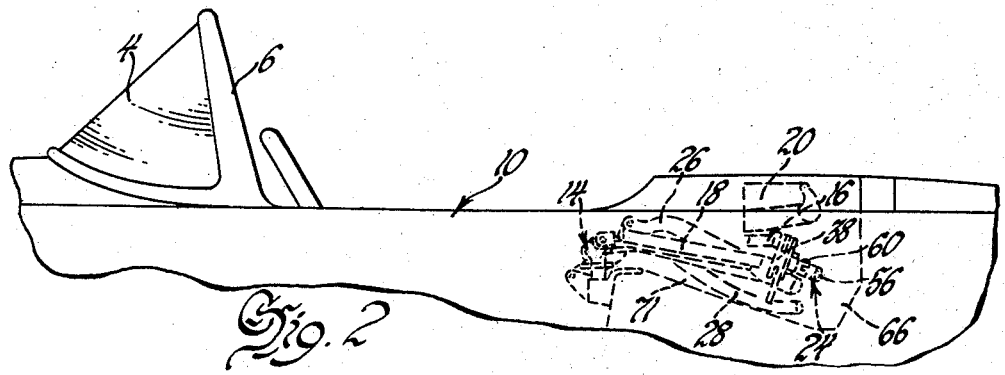
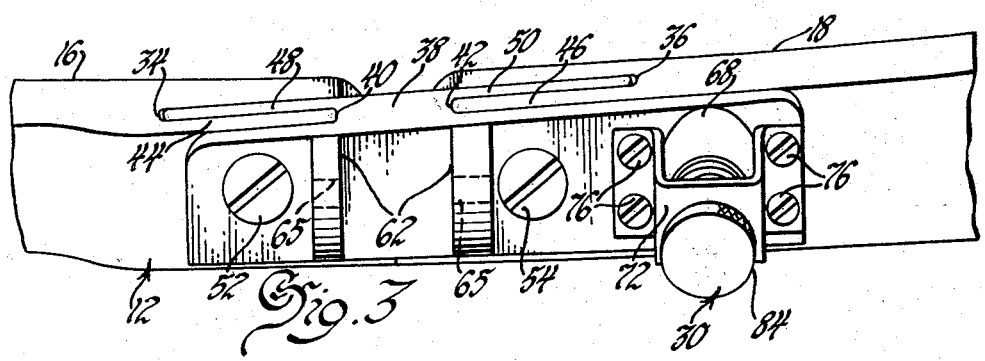
INVENTORS
Gerhard C. R. Kuiper &
BY John W. Pyuro
Paul Fitzpatrick
ATTORNEY

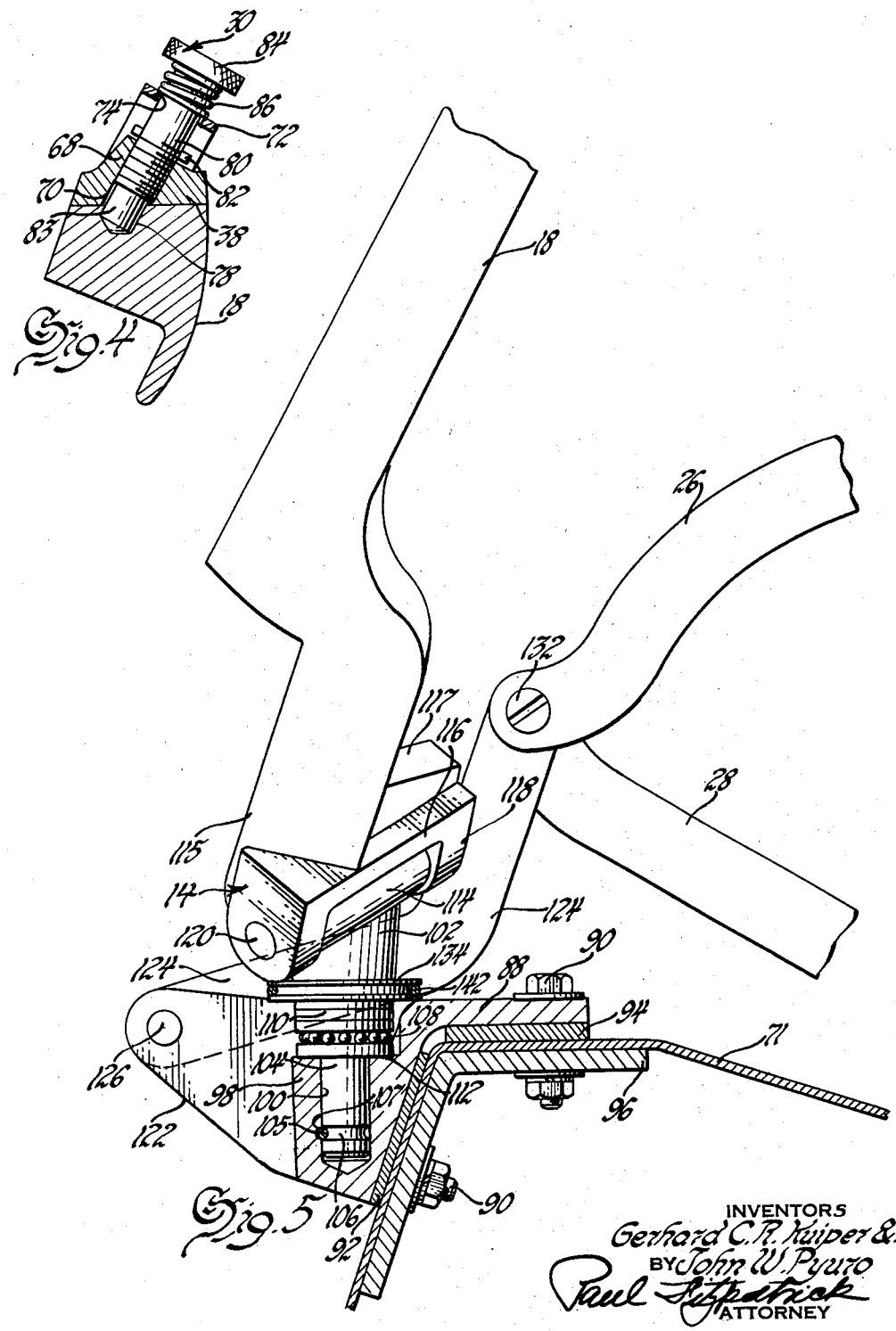

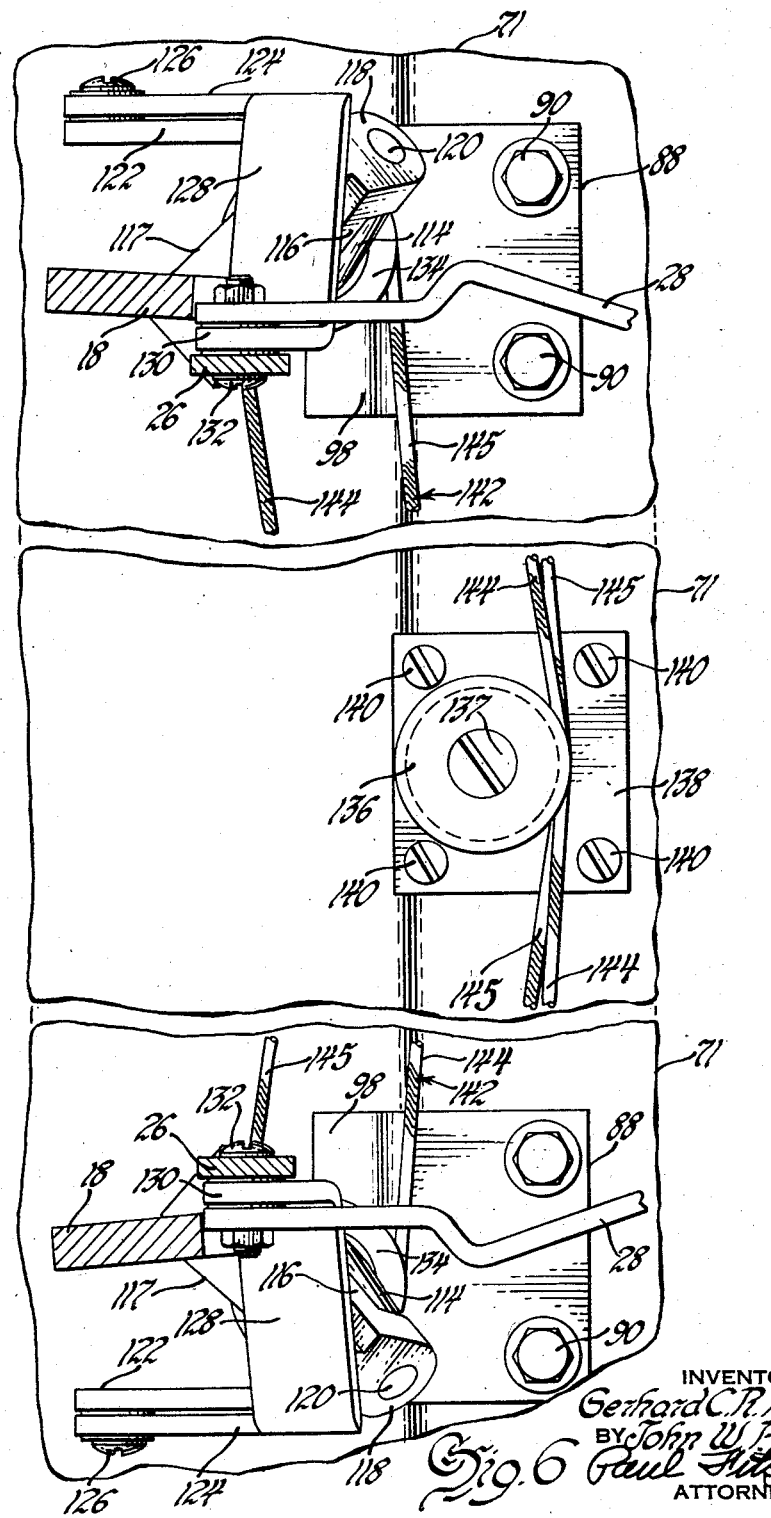

United States Patent Office 2,860,913
Patented Nov. 18, 1958

2,860,913

FOLDING TOP WITH INWARDLY COLLAPSING SIDE RAILS

Gerhard C. R. Kuiper, Birmingham, and John W. Pyuro, Warren, Mich., assignors to General Motors Corporation, Detroit, Mich., a corporation of Delaware Application November 1, 1954, Serial No. 465,827

6 Claims. (Cl. 296—107)

This invention relates to a folding top and more particularly to a convertible top for an automobile body.

In many known convertible tops, the raising and lowering of the top is controlled by various types of linkage systems associated with the supporting frame for the top. These linkage systems often require an inordinate amount of space within the automobile body since they usually have a large number of parts and are often very complicated. This invention provides a convertible top which is raised and lowered without the use of such linkage systems.

In the preferred embodiment of this invention, the supporting frame for the convertible top includes spaced side rails having pivotally interconnected front and rear sections which fold inboard of the body when the top is lowered and unfold toward the sides of the body from their inboard positions when the top is raised. The rear sections of the side rails are pivotally supported by the body. The pivotal connections between these sections and the body include vertical axes of rotation and axes of rotation angular to the vertical axes and in fixed relationship thereto. The rear sections rotate about the angular axes of rotation to fold and lower the top or to unfold and raise the top. After the top is partially folded and partially lowered or partially unfolded and partially raised, the rear sections and the angular axes rotate slightly about the vertical axes of rotation before the top is completely folded and lowered or completely unfolded and raised. Locking means are provided to prevent folding movement of the side rails when the top is in its raised position. A number of transverse bows interconnect the side rails, one of the bows being foldable with the side rails, and a number of other bows are pivotally supported on the body. A cable equalizer is provided to ensure equal rotation of the rear rail sections about the vertical axes.

An object of this invention is to provide an improved convertible top for an automobile. A more specific object of this invention is to provide a convertible top for an automobile and a supporting frame for the top including spaced sectional side rails foldable inboard of the body to lower the top and unfoldable toward the sides of the body to raise the top, the folding and unfolding movement of the side rails and the lowering and raising of the top being controlled by rotational movement of one of the sections of each rail about an axis angular to the horizontal and a vertical axis. A further specific object of this invention is to provide a convertible top for an automobile and a supporting frame for the top including spaced sectional side rails foldable inboard of the body to lower the top and unfoldable toward the sides of the body to raise the top, the folding and unfolding movement of the side rails and the lowering and raising of the top being controlled by rotational movement of one of the sections of each rail about an axis angular to the horizontal and a vertical axis in fixed relationship to the angular axis.

These and other objects of this invention will be readily apparent from the following specification and drawings, in which:

Figure 1 is a partial view of a convertible automobile having the folding top of this invention mounted thereon showing the top in its raised position;

Figure 2 is a view of the same automobile showing the folding top in its lowered position;

Figure 3 is an enlarged plan view of the pivotal connection between the side rail sections and also the locking mechanism preventing folding movement of the side rails when the top is in its raised position;

Figure 4 is an enlarged view on the plane indicated by line 4—4 of Figure 1 showing the locking mechanism;

Figure 5 is an enlarged view of a portion of one of the rear rail sections and its pivotal connection to the automobile body, the view being taken in a partially lowered position of the top; and Figure 6 is a top plan view of the pivotal connections of the rear rail sections to the automobile body, the top being in its raised position.

Referring now to Figure 1 of the drawings, a convertible automobile 2 has a windshield 4 and a windshield header 6. A folding top 8 is provided to cover the open body 10 of the automobile. The supporting frame for the top includes spaced side rails 12 pivotally supported by body 10 at 14 and having front sections 16 and rear sections 18, a front header or bow 20 fitting over the windshield header 6 and pivotally connected to the front sections 16 by pins 22, and transverse bows 24, 26, and 28. Suitable latching mechanism may be provided to latch the front header to the windshield header in the raised position of the top. The spaced side rails 12 fold inboard of the body when the top is lowered from its raised position, and, in order to prevent folding movement of the rails when the top is in its raised position, a locking mechanism 30 is provided. The supporting frame for the top is the same on either side of the body, and therefore like numerals will be used for like parts.

Figure 3 of the drawings shows the pivotal connections between the front sections 16 and the rear sections 18. The front sections 16 are slotted at 34 and the rear sections 18 are slotted at 36. Connecting links 38 are slotted at 40 and 42, and portions 44 and 46 of the front and rear sections 16 and 18, respectively, fit in these slots and portions 48 and 50 of links 38 fit in slots 34 and 36, respectively, of the front and rear sections. Links 38 are pivotally connected to the front sections 16 by pins 52 and to the rear sections 18 by pins 54.

Referring now to Figures 1 and 3 of the drawings, bow 24 has three sections, a center section 56 and two end sections 58 pivotally connected to the center section at 60. The upper surface of each link 38 has two upright lugs 62 and the end sections 58 of bow 24 are pivotally connected to lugs 62 by pins 64 extending through aligned openings 65 in the lugs. The side rails 12 fold inboard of the body when the top is lowered, and the end sections 58 of bow 24 fold under the center section 56 as the side rails move inboard of the body. This allows the front header or bow 20, bow 24, side rails 12, and bows 26 and 28 to be folded together in a compact arrangement and stored within the body 10 in a well 66 shown in Figure 2. Figure 2 shows the folding top in its lowered position, with the various parts of the top outlined in dash lines. A cover may be provided for well 66 and may either be power or manually operated. For a complete description of such a cover, reference may be had to Serial No. 405,106, filed January 20, 1954, Kenneth A. Pickering, assigned to the assignee of the present invention.

Figures 3 and 4 of the drawings show the locking mechanism which locks links 38 to the rear sections 18 when the top is in its raised position and prevents the side rails from folding inboard of the body 10. The upper surfaces of links 38 are provided with bosses 68 with threaded bores 70. U-shaped brackets 72 extend over bosses 68 and have openings 74 aligned with threaded bores 70. Brackets 72 are secured to links 38 at 76. The upper surfaces of the rear sections 18 have openings 78 which are in alignment with bores 70 when the top is in its raised position, as shown in Figure 4. Threaded studs 80 extend through openings 74 of brackets 72 and fit within bores 70. Pins 82 are provided to limit the outward movement of the studs. The inner ends 83 of studs 80 fit within openings 78, and the outer ends of the studs are provided with knurled caps 84 by which the studs can be rotated. Compression springs 86 extend between caps 84 and brackets 72 and continually urge the studs outwardly from bores 70. Links 38 must be unlocked from rear sections 18 before the top can be lowered. This is done by rotating studs 80 until their inner ends 83 are removed from openings 78. When the top is raised, the studs are rotated in the opposite direction until their inner ends again fit within openings 78 and lock links 38 to the rear sections 18.

Figures 5 and 6 show the pivotal connections 14 between the rear sections 18 and the body 10. Brackets or supports 88 are bolted at 90 to body panel 71 forming the lower wall of well 66. Spacing members 92 and 94 are provided between supports 88 and panel 71, and angular pads 96 are used to reinforce panel 71. The forward portions of supports 88 are formed to provide bosses 98 having vertical bores 100. Tapered annular members 102 have extensions 104 which are piloted in bores 100. The annular members are retained in the bores by removable pins 105 fitting in annular grooves 106 of extensions 104 and grooves 107 in bosses 98. Thrust bearings 108 and washers 110 are provided between members 102 and the upper surfaces 112 of bosses 98. Thus, the annular members rotate about vertical axes and also form part of the pivotal connections 14 between the rear sections 18 and the body 10, as will be described.

The upper portions of annular members 102 bear tubular heads 114 which are oblique to the vertical axes of rotation of members 102. The terminal portions 115 of rear sections 18 are secured to U-shaped brackets 116, and reinforcing webs 117 are also provided to strengthen this joint. The legs 118 of the brackets 116 are pivotally connected to tubular heads 114 of annular members 102 by pins 120. Brackets 116 and tubular heads 114 form the pivotal connections between the rear sections 18 and annular members 102, the axes of rotation of rear sections 18 being defined by pins 120 oblique to the vertical axes of rotation of members 102. However, it should also be noted that the rear sections 18 can also move with annular members 102 and rotate about the vertical axes of rotation of these members as well as the angular axes of rotation. The vertical axes of rotation of members 102 intersect the angular axes of rotation in vertical planes, with the points of intersection lying approximately at the midpoints of pins 120 defining the angular axes of rotation.

Brackets 122 are secured to supports 88, and links 124 are pivotally connected to brackets 122 at 126. Links 124 are offset inboard of the body at 128 and terminate in upright portions 130 which are pivotally connected to bows 26 and 28 at 132. The movement of bows 20 and 24 is controlled by the folding movement of the side rails 12, and the movement of bows 26 and 28 is controlled by fabric travel. Annular members 102 are provided with pulleys 134, and a pulley 136 is pivotally mounted at 137 on a bracket 138 mounted on panel 71 at 140. Pulley 136 is placed to the rear of a line between pulleys 134 in order that tension may be placed on cable 142 mounted on the pulleys. The cable is secured to pulleys 134 by suitable means, and has portions 144 and 145 which pass over pulley 136. Portion 144 of cable 142 extends from the forward portion of the pulley 134 shown in the upper portion of Figure 6 to the rear portion of the pulley 134 shown in the lower portion of Figure 6, and portion 145 of the cable extends from the rear portion of the upper pulley 134 of Figure 6 to the forward portion of the lower pulley 134. Thus, cable portions 144 and 145 cross between pulley 136 and the lower pulley 134 of Figure 6 so that rotational movement of the upper pulley 134 through either a counterclockwise or a clockwise arc will cause rotational movement of the lower pulley 134 through the same arc in an opposite direction. The cable provides an equalizer for annular members 102, and equalizes the extent of rotation of each annular member. If desired, annular members 102 may be provided with lateral extensions in place of the pulleys, one extension extending to the rear of one member and the other extension extending forward of the other member. The extensions may be interconnected by a rod or link to equalize the extent of rotation of members 102 about their vertical axes.

Referring now to Figure 1, it will be noted that pins 22, 52, and 54 are parallel to each other although inclined to the vertical. These pins must be parallel to each other in order that the side rails 12 will fold inboard of the body or unfold toward the sides of the body. Although the pins are shown inclined to the horizontal, they may also be normal to the horizontal, for as long as the pins are parallel to each other and allow folding movement of the side rails, their angular relationship with the horizontal is immaterial. Likewise, there is no correlation between the angular relationship of the pins to the horizontal and the vertical axes of rotation or the angular axes of rotation.

Referring now to Figures 5 and 6, the vertical axes of rotation of members 102 intersect the angular axes of rotation defined by pins 120 in vertical planes at approximately the midpoints of pins 120. In this specific embodiment of the top, a plane passing through an angular axis of rotation and perpendicular to the vertical will intersect the horizontal at an angle of approximately 30°, and a plane passing through an angular axis of rotation and normal to the horizontal will form an angle of approximately 39° with a vertical plane passing through the center line of the body. The angular relationship between an angular axis of rotation and the horizontal or vertical is controlled by the width of the body, the depth of well 66, the length of well 66, and the span of the top measured from a vertical axis of rotation ot the front header or bow. These factors also control the point of intersection of a vertical axis of rotation and an angular axis of rotation, whether the point of intersection will be at the midpoint of a pin 120 defining an angular axis of rotation or will be offset from the midpoint, or whether the axes of rotation will intersect or will lie in parallel vertical planes. Thus, each particular installation will require a different geometry between the vertical axes of rotation and the angular axes of rotation and also between the angular axes of rotation and the horizontal or vertical.

The operation of the top is as follows: Assuming that the top is in its raised position shown in Figure 1 and it is desired to lower the top to its position shown in Figure 2. The front header or bow 20 will be unlatched from the windshield header 6 if necessary, and links 38 are unlocked from the rear sections 18 to allow the side rails to fold inboard of the body. The rear sections 18 are rotated inboard of the body toward the center line thereof about the angular axes of rotation defined by pins 120 until the side rails 12 are partially folded and the end sections 58 of bow 24 have partially folded under the center section 56. The annular members 102 and the rear sections 18 are then held in fixed relationship and the assemblies slightly rotated about the vertical axes of rotation, with the lower assembly shown in Figure 6 rotating clockwise as viewed from above the body and the upper assembly in Figure 6 rotating counterclockwise as viewed from above the body. This is done to change the relationship between the paths of movement of pins 22, 52 and 54 and the center line of the body, for these pins must move parallel to the center line of the body before the top can be completely lowered. After this slight rotation, the folding of the top is continued by rotation of the rear sections 18 inboard of the body toward the center line thereof about the angular axes of rotation defined by pins 120. Then the rear sections 18 and the annular members 102 are again held in fixed relationship and the assemblies slightly rotated about the vertical axes of rotation either to their initial starting position or to a position slightly beyond this position, with the lower assembly shown in Figure 6 rotating counterclockwise as viewed from above the body and the upper assembly shown in Figure 6 rotating clockwise as viewed from above the body. The folding of the side rails and the center bow then continues and the top is lowered into well 66 as the rear sections 18 again rotate inboard of the body toward the center line thereof about the angular axes of rotation defined by pins 120.

No mechanism is provided to hold the rear sections 18 and the annular members 102 in fixed relationship when both are rotated about the vertical axes of rotation, for this rotation by itself fixes the position of these members. The rotation about the vertical axes is very slight, and in certain installations may be negligible. This slight rotation takes care of any binding that may take place at the pivotal connections formed by pins 22, 52, and 54, and ensures that as the folding of the side rails and the center bow continues, the pins will move parallel to the center line of the body as the top is lowered into well 66. The exact points at which the rear sections 18 and the annular members 102 move toward the rear of the body and toward the forward part of the body about the vertical axes of rotation differ in each installation. This rotational movement is very small and the folding and unfolding movement of the top is a continuous operation in all instances.

To raise the top from its position shown in Figure 2 to its position shown in Figure 1, the above operation is reversed, and when the top is in its raised position links 38 are again locked to the rear rail sections 18. The rear bows 26 and 28 rotate about horizontal axes and are controlled by fabric travel alone. As the top is folded, the fabric loosens from its tightly stretched state in the raised position, and these bows begin to approach well 66. As the folding operation continues, they assume the positions in well 66 shown in Figure 2. When the top is raised, the bows are again controlled by fabric travel and do not assume their fully raised positions until the side rails are completely unfolded and the top fabric stretched taut over the supporting frame.

Cable 142 is secured to pulleys 134, preferably at a point directly outboard of the vertical axes of rotation. As the rear sections 18 and annular members 102 are rotated about the vertical axes of rotation, the cable ensures that each annular member will rotate through an equal arc and prevents lateral movement of the supporting frame as it is lowered into or raised out of well 66.

Thus, this invention provides a folding top for a convertible automobile having a minimum number of parts and easily operable to raise and lower the top. The sectional side rails of the supporting frame fold inboard of the body or toward the sides of the body as the rear sections rotate about the angular axes and the vertical axes.

While a specific embodiment of this invention has been shown and described, various changes and modifications may be made within the scope and spirit of the invention.

We claim:

1. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, means on said body defining a pair of converging axes extending angularly forwardly and downwardly inboard of said body, and means swingably mounting each of said rear rail sections on a respective axis for folding said rails inboard of said body upon pivotal movement of said rear rail sections rearwardly and downwardly of said body about said axes.

2. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, means on said body defining a pair of converging intersecting axes extending angularly forwardly and downwardly inboard of said body, means swingably mounting each of said rear rail sections on a respective axis for folding said rails inboard of said body upon pivotal movement of said rear rail sections rearwardly and downwardly of said body about said axes, and means for adjusting the included angle between said intersecting axes during folding movement of said rails inboard of said body.

3. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, means on said body defining a pair of parallel spaced axes and a pair of converging axes extending angularly forwardly and downwardly inboard of said body, means swingably mounting each of said rear rail sections on a respective one of said converging axes for folding said rails inboard of said body upon pivotal movement of said rear rail sections rearwardly and downwardly of said body about said converging axes, and means for rotating each of said rear rail sections about a respective one of said parallel spaced axes during folding movement thereof inboard of said body to adjust the angular relationship between said converging axes.

4. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, spaced means rotatably mounted on said body for movement about substantially parallel spaced axes and defining a pair of converging axes extending angularly forwardly and downwardly inboard of said body, means for swingably mounting each of said rear rail sections on a respective one of said converging axes for folding said rails inboard of said body upon pivotal movement of said rear rail sections rearwardly and downwardly of said body about said converging axes, and means for rotating each of said spaced means about a respective parallel spaced axis during folding movement of said rails inboard of said body for adjusting the angular relationship of said converging axes with respect to each other.

5. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, spaced means rotatably mounted on said body for movement about substantially parallel spaced axes and defining a pair of converging axes extending angularly forwardly and downwardly inboard of said body, means swingably mounting each of said rear rail sections on a respective one of said converging axes for folding said rails inboard of said body upon pivotal movement of said rear rail sections rearwardly and downwardly about said converging axes, and means interconnecting said spaced means for simultaneously rotating each of said means about a respective one of said parallel spaced axes during folding movement of said rails inboard of said body to adjust the angular relationship of said converging axes with respect to each other.

6. In an automobile having a body and a convertible top, a supporting frame for raising and lowering said top comprising, spaced foldable side rails, each rail including a front rail section and a rear rail section, means pivotally interconnecting the sections of each rail for folding movement thereof inboard of said body, means on said body defining a pair of generally parallel spaced vertical axes and a pair of converging axes extending angularly forwardly and downwardly inboard of said body, means swingably mounting each of said rear rail sections on a respective one of said converging axes for folding said rails inboard of said body upon pivotal movement of said rear rail sections rearwardly and downwardly of said body about said converging axes, and means for rotating each of said rear rail sections about a respective one of said parallel spaced vertical axes during folding movement thereof inboard of said body to adjust the angular relationship between said converging axes.

References Cited in the file of this patent

UNITED STATES PATENTS 2,768,857  Albrecht _____ Oct. 30, 1956

FOREIGN PATENTS 40,609  Denmark _____ July 31, 1929